J. S. STEWART.
DEVICE FOR TEMPORARILY RETAINING CONDUCTORS.
APPLICATION FILED NOV. 8, 1912.
1,142,282.
Patented June 8, 1915.
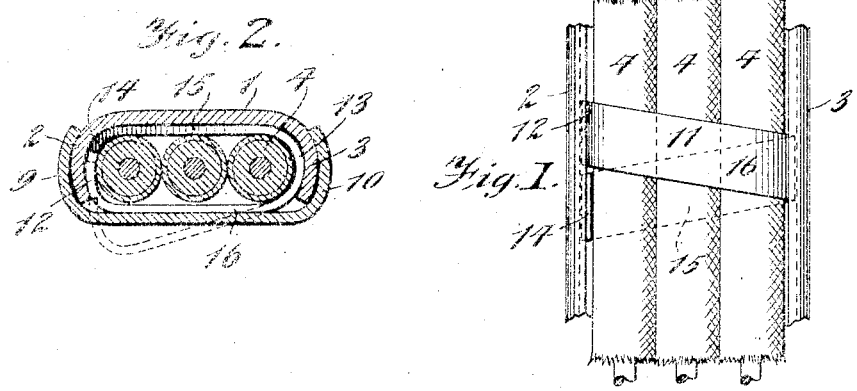

UNITED STATES PATENT OFFICE.

JAMES S. STEWART, OF NEW YORK, N. Y., ASSIGNOR TO ANNIE STEWART, OF NEW YORK, N. Y.

DEVICE FOR TEMPORARILY RETAINING CONDUCTORS.

1,142,282.

Specification of Letters Patent.

Patented June 8, 1915.

Application filed November 8, 1912. Serial No. 730,142.

*To all whom it may concern:*

Be it known that I, JAMES S. STEWART, a citizen of the United States, residing at the city of New York, in the borough of Manhattan and State of New York, have invented certain new and useful Improvements in Devices for Temporarily Retaining Conductors, of which the following is a full, clear, and exact description.

This invention relates to moldings for electrical conductors and has special reference to means for temporarily holding the conductors in the base portion of the molding while the cap thereof is being applied to or removed from the base.

One of the objects of the invention is to provide a practical and efficient device of the character described which will securely hold conductors in place and will permit their ready removal.

Another object is to provide a simple, cheap device of the kind described which may be used with a maximum of convenience by the operator.

Other objects will be in part obvious and in part pointed out hereinafter.

In connection with the use of moldings for electrical conductors, it is to be noted that the usual practice in inserting the conductors is to attach one section, the base, of the molding or conduit to a wall, for example, and then to place the conductor or conductors within this conduit, subsequently closing the conduit with the conductors therein by placing another section of molding, the cap, over the first one.

The operation as heretofore practised is a difficult one on account of the fact that with long stretches of wire and sometimes with shorter stretches, it is troublesome to keep the conductors together before and while within the base section which has been attached to the wall prior to placing the cap section thereupon, this being particularly true when the molding is attached to the ceiling.

That the present invention overcomes the difficulty mentioned and accomplishes as well the objects enumerated, will be apparent by reference to a specific embodiment of the invention which is included in the accompanying drawing, wherein, Figure 1 represents a plan view of a portion of a conduit showing my improved form of attaching member; and Fig. 2 is a cross-sectional view of the two portions of the conduit with the conductors and attaching member correctly positioned therein.

1 designates the base portion of a conduit here shown as a common type of wiring molding. This molding may be of metal or any other desirable substance and, as is well known, is usually provided in lengths of ten or more feet. Through the wall of this molding pass apertures (not shown) which are provided in order to permit the attachment of the sections to the wall or other object. This attachment may be effected in any convenient manner, as by screws or the like. The section of molding adapted to be attached to the wall is provided with outwardly-projecting or off-set flanges 2 and 3 which are here shown as formed by bending to substantially rightangular positions or otherwise shaping the metal at points adjacent its ends.

The conductors 4 are as usual deposited side by side in this conduit and have to be temporarily retained in some manner while and until the cap strip or section 8 of the molding is adjusted. To do this I provide a removable clip member 11 which comprises one complete turn of the flattened helix, the two extremities 12 and 14 being curved to engage with one of the curved flanges 2 or 3 of the base section of the molding, while the loop portion 13 thereof is curved to fit and engage the other flange. In assembling, the clip 11 is first placed around the conductors which are usually used in sets of two or more, and will hold the conductors together until the clip members are inserted into the base section of the molding. When inserted, the portions 12, 13 and 14 fit snugly against and frictionally grip the flanges 2 and 3 of the base section 1, and the inner portion 15 of the flattened helix will rest against the bottom of the base section, the outer section 16 lying over the conductors and retaining them in place. It has been found in practice that the insertion of these clips to bridge the conduits at, say, intervals of a few feet will temporarily hold the conductors in place, but of course the intervals, as well as the general dimensions of the strips themselves, will depend largely upon the size of the molding and the size of the conductors. When the conductors have thus been temporarily secured, the removable, longitudinal section or cap-strip 8 of the molding, which is adapted to telescope over the section 1, may be put in place, thus closing the conduit in the usual manner. This section 8 is provided with inwardly-extending curved arms or flanges 9 and 10, which are adapted to interlock, respectively, with the outwardly-extending curved arms or flanges 2 and 3 of the base, the section 8 being of such size that it may be snapped over the section 1 and held in place by friction in the usual manner. The presence of the clip 11 does not in any manner interfere with the adjustment of the cap-strip and they may be left in place without disadvantage. Thus they will again serve to hold the wires in place whenever the cap-strip is removed.

Having thus described my invention, I claim:—

A wire retaining clip adapted for use with wiring molding having side flanges comprising a metallic strip bent to form one turn of a flat helix and having its extremities at one of the narrow ends of the helix, said extremities overlapping each other and said helix being shaped to have its narrow ends engage and interlock with the side flanges of the wiring molding.

In witness whereof, I subscribe my signature, in the presence of two witnesses.

JAMES S. STEWART.

Witnesses:
WALDO M. CHAPIN,
WILLIAM C. LARY.